United States Patent [19]

Fallström

[11] Patent Number: 5,032,179

[45] Date of Patent: Jul. 16, 1991

[54] BINDER COMPOSITION, AN AIR DRYING LACQUER COMPRISING THE COMPOSITION AND USE OF THE COMPOSITION IN AN AIR DRYING LACQUER

[75] Inventor: Bo Fallström, Söderhamn, Sweden

[73] Assignee: Bergvik Kemi AB, Sandarne, Sweden

[21] Appl. No.: 435,469

[22] PCT Filed: Jun. 22, 1988

[86] PCT No.: PCT/SE88/00348

§ 371 Date: Dec. 6, 1989

§ 102(e) Date: Dec. 6, 1989

[87] PCT Pub. No.: WO88/10287

PCT Pub. Date: Dec. 29, 1988

[30] Foreign Application Priority Data

Jun. 24, 1987 [SE] Sweden .................................. 8702621

[51] Int. Cl.$^5$ ............................ C09F 7/00; C09F 9/00
[52] U.S. Cl. ................................. 106/264; 106/253; 106/310
[58] Field of Search ................................. 106/253, 264

[56] References Cited

U.S. PATENT DOCUMENTS

| | | | |
|---|---|---|---|
| 3,333,978 | 8/1967 | Clark et al. | 106/264 |
| 3,830,763 | 8/1974 | Gillan et al. | 106/264 |
| 4,090,886 | 5/1978 | Turner | 106/310 |
| 4,622,072 | 11/1986 | Turner | 106/264 |

Primary Examiner—Theodore Morris
Assistant Examiner—David M. Brunsman
Attorney, Agent, or Firm—Oblon, Spivak, McClelland, Maier & Neustadt

[57] ABSTRACT

A binder composition for preparing an air drying lacquer, comprising a binder in combination with an organoaluminum compound, the binder being an ester reaction product of an unsaturated, monobasic, aliphatic carboxylic acid having 16-24 carbon atoms or a mixture thereof, optionally with other acids, and a polyhydric alcohol having 6-8 hydroxyl groups. The invention also refers to an air drying lacquer free from solvents comprising said binder composition, siccative, and optionally pigments and other conventional additives.

11 Claims, No Drawings

BINDER COMPOSITION, AN AIR DRYING LACQUER COMPRISING THE COMPOSITION AND USE OF THE COMPOSITION IN AN AIR DRYING LACQUER

The present invention relates to a binder composition for preparing an air drying lacquer, and an air drying lacquer comprising said binder composition, siccative, and optionally pigments and other conventional additives. Paints according to the invention are well apted for indoor painting of carpentry, doors and windows and give a scratch resistant, high gloss surface.

For painting of carpentry indoors one uses today paint based on oil modified alkyds, which give a high gloss surface being very resistant to soiling, washing and wear. Said paints are easy applied but contain large amounts of solvents, usually white spirit, which in high concentrations in air will be a health risk for the user.

With a view to decrease the amount of solvent in the paint low viscous, air drying vegetable oils or tall oil esters have been added as non volatile diluents to the alkyd. By this it has been possible to reduce the solvent content to about 15-20% of the paint. If the oil content has been increased problems have arisen during the drying owing to skin drying of the paint which gets a wrinkled surface. In order to overcome these drying problems it is known to use organoaluminum compounds reacting with free carboxyl and free hydroxyl in the binder. By this the through drying is improved, but at the same time storage problems arise with the relatively high polymer alkyd, which reacts in the can giving a strong increase of the viscosity.

In the U.S. Pat. No. 4,090,886 storage stable drying compositions are described, comprising a drying oil or alkyd and a derivative of an aluminum alkoxide, which are said to be usable for preparing a paint having a solids content of up to 80%.

Air drying compositions comprising an alkyd and an oxo-aluminum complex are also described in EP 0 018 780.

In paints which are solely based on vegetable oils or tall oil esters to which have been added conventional siccatives it has been possible to reduce the solvent content to 5-10%, but the through drying of said paints has been too poor to make them usable. It is also known that paint can be based on latex dispersions or alkyd emulsions in order to get away from the organic solvents. Said two types of binders however give paints which are hard to apply. The latex paints are in addition thermo plastics and are fairly sensible to water, scratch sensible and hard to keep clean, and in addition it is not possible to obtain a high gloss surface with said paints.

It has now surprisingly been found that a binder composition consisting of an ester reaction product of an unsaturated, monobasic, aliphatic carboxylic acid having 16-24 carbon atoms or a mixture thereof, optionally with other acids, and a polyhydric alcohol having 6-8 hydroxyl groups as a binder in combination with an organo aluminum compound as a dryer can be used for preparing an air drying lacquer completely without solvents.

In this context the expression lacquer refers to a surface treating material comprising a binder and being either unpigmented, that is a varnish, or containing a pigment, that is an enamel.

A lacquer according to the invention has an excellent brushability, superior to latex and alkyd emulsion paints, in certain respects even better than alkyd paints, and a quite acceptable drying time. Lacquers according to the invention have a good levelling and give a glossy surface, and are therefore well apted for painting carpentry such as furniture, cupboards, doors and windows. An advantage, due to the lack of solvents, is also that the applied lacquer film does not shrink during drying but maintains the original thickness, which is likely to mean that the hiding power is better and that fewer coats are needed.

The organo aluminum compound used in the binder composition is present in an amount giving a content of 0.1-5% by weight of Al based on the weight of the binder, preferably 1-3% by weight.

The ester reaction product in the binder composition according to the invention is obtained by esterification of an unsaturated, monobasic, aliphatic carboxylic acid having 16-24 carbon atoms, or a mixture of one or more of said acids and other acids. The unsaturated monobasic carboxylic acid preferably is polyunsaturated. As examples of suitable acids could be mentioned oleic acid, ricinenic acid, linoleic acid and linolenic acid. Fatty acids or fatty acid mixtures obtained by splitting vegetable or animal oils, such as soybean oil fatty acid, linseed oil fatty acid, cottonseed oil fatty acid, safflower oil fatty acid, sunflower oil fatty acid, perilla oil fatty acid, tung oil fatty acid, dehydrated castor oil fatty acid, fish oil fatty acid, are preferable used. While the vegetable fatty acids mainly consist of unsaturated fatty acids having 16-18 carbon atoms, the fish oil fatty acids mainly consist of unsaturated fatty acids having 20-24 carbon atoms. For commercial reasons it is conveniant to use a mixture of one or more unsaturated $C_{18}$ fatty acids, for instance tall oil fatty acid.

A polyhydric alcohol having 6-8 hydroxyl groups which is used in esterification of the acids stated above for preparing an ester reaction product, can be an aliphatic or alicyclic alcohol. As examples of usable polyols can be mentioned di- and tripentaerythritol, as well as reducing monosacharides, such as sorbitol. When an aliphatic alcohol having 6-8 hydroxylic groups is used a binder composition showing improved drying characteristics is obtained.

The ester reaction product which is used as a binder is obtained by heating the reactants to the esterification temperature, from 150-160° C. up to 230°-235° C. The heating is then to continue at this temperature until the major part of the acid groups have reacted, and the acid value has been reduced to 5-25 mg KOH/g. This will generally take from 7 to 12 hours. It is important that the temperature will not be too high bringing the ester to polymerize. In order to have the ester reaction product to function as a binder without the addition of a solvent it is necessary that the viscosity is sufficiently low and that consequently the ester product is predominantly monomeric.

Although the proportion of acid to alcohol should be equimolar in the final ester product, it has turned out to be of advantage to perform the esterification with an excess of the alcohol. From an equimolar amount up to an equimolar excess of about 25% of the alcohol, preferably 5-10%, works well. If a small excess is used the reaction time will be long, increasing the risk for polymerisation. A larger excess however increases the risk for cloudiness.

If the acid value of the final ester product should be too high, that is much over 10 mg KOH/g, a low molecular di- or trialcohol can be added to reduce the number of free carboxyl groups in order to obtain an optimal acid value of e.g. 5-10. Glycerol has proved to be a suitable alcohol for esterification of residual carboxyl groups.

The organo aluminum compound to be used in the binder composition according to the invention is a derivative of an aluminum alkoxide or an oxy aluminum acylate. For example can be mentioned the products which are supplied by Manchem Ltd, Manchester, England under the trademark Alusec, such as Alusec 588 (aluminum triisobutoxide/aluminum triethylacetoacetate-complex), Alusec 591 (aluminum ethylacetoacetate-diisopropylate), Alusec 801 (aluminum monoethylacetoacetate-isopropyl alcohol-complex), and under the trademark Manalox, such as Manalox 36 (aluminum diisopropoxide-monoethylacetoacetate). Another example of an organoaluminum compound is an oxo aluminum-ethylacetoacetate-isobutoxide which can be obtained from Manchem Ltd under the designation EP 9095.

Said organoaluminum compounds are obtained from the manufacturer dissolved in a solvent in such a concentration that when a lacquer is made therewith the solvent will constitute 1-3% by weight of the lacquer composition.

The binder composition according to the invention is prepared by mixing the ester reaction product, which has been obtained by esterification of the unsaturated, monobasic carboxylic acid with the polyhydric alcohol, with the organoaluminum compound at ambient temperature. If a lacquer completely free from solvent is aimed at it is convenient to evaporate the solvent deriving from the organoaluminum compound from the binder composition by heating. A binder composition obtained in this way has an excellent storability.

The binder composition can optionally be thixotropic, which could be obtained in any conventional way by the addition of a thixotropic agent. A preferred thixotropic agent is the polyamide product formed by a polycondensation reaction between dimer acids and di- or triamines, marketed by General Mills Inc. under the trade name "Versamide". To obtain thixotropy the binder is treated with the polyamide at elevated temperature.

The air drying lacquer according to the invention comprises in addition to a binder and an organoaluminum compound, and optionally a thixotropic agent, which is the stated binder composition, a siccative, and optionally pigments and other conventional additives.

Siccative is used as a catalyst to accelerate the drying of oxidatively drying binders. Preferably cobolt or zirconium salts are used, such as naphtenate and octoate, but also salts of lead, zinc, calcium and manganese can be used. A suitable siccative is for instance Cozirk ®69 (from Manchem Ltd), a complex of cobolt and zirkonium containing 6% cobolt and 9% zirkonium.

Pigments which can be used in the lacquer according to the invention can be organic or inorganic pigments. As examples can be mentioned titanium dioxide, red iron oxide, carbon black, phthalocyanine blue and iron blue, and organic yellow and red pigments.

As examples of conventional additives to a lacquer can be mentioned antiskinning agents, consistency providers.

A lacquer according to the invention is prepared in a conventional way by mixing the binder composition with the pigment for dispersing thereof, for instance in a cone mill or a pearl mill, to the deciderate grinding degree.

The invention is described more in detail in the following examples which illustrate the manufacture of binder compositions and lacquers according to the invention. Comparative examples are given to show the effect of the different constituents.

The viscosity of the binder was measured by an Emila rotation viscometer and the viscosity of the paint in accordance with SIS 18 41 19, (ed. no. 2 1973), with a Rotovisco rotation viscometer.

In order to test the characteristics of the lacquer it was applied on a mirror glass plate in a film thickness, determined according to SIS 18 41 58, of 30 $\mu$m or 50 $\mu$m. The drying was determined for a film of 30 $\mu$m by means of an ICI Drying Recorder with a scribing needle. The scratch hardness was tested on a film of 50 $\mu$m.

In addition the gloss was measured according to SIS 18 41 84 (60° C.).

EXAMPLES

Example 1

An ester was made by charging 2877 g tall oil fatty acid having an acid value (AV) of 195 mg KOH/g and 458 g dipentaerythritol to a reactor of 4 liter. The reactor was provided with a stirrer, thermometer and an arrangement for evacuating water from the reaction. It was also possible to sparge inert gas during the reaction. The reactor was heated by an electric jacket and the temperature was controlled by a programmable microprocessor based temperature control.

The stirrer and sparging of nitrogen was started and the temperature then was increased with a rate of 25° C./h to 235° C. and was maintained at this temperature to an AV of 11.0 and an Emila viscosity at 20° C. of 350 mPa·s.

The Gardner colour value was 4-5.

From said ester a paint was made, composed of 67.5 g of the ester above and 25 g TiO$_2$ of rutile-type. The paint was ground on a cone mill to a grinding degree of 5 $\mu$m and was siccativated with 0.06% Co and 0.09% Zr, calculated as metal based on the binder content (ester content), and 0.1% methyl ethylketoxim was added to prevent skinning. To be tested the paint was applied on a mirror glass plate (panel) with an applicator giving a dry film of 50 $\mu$m.

The drying time (according to needle on a ICI Drying Recorder) was 4¼h. The paint showed at a dry film thickness of 50 $\mu$m a tendency to wrinkle drying, that is surface drying without through drying. Panels with the paint which had been aged in darkness for 4 months were clearly yellowed and still very scratch sensible.

A new paint was made according to the recipe above, but was now siccativated, in addition to Co and Zr, also with oxo aluminium ethylacetoacetate isobutoxide (Ep 9095 from Manchem) is an amount corresponding to 10% of the binder. This gave 1% Al calculated on the binder. The drying time, ICI needle, 6½ h. The paint showed no tendency to wrinkle drying and was already after 1 week very insensible for nail scratching. After drying for 4 months in darkness the paint was hardly observably yellowed. After one month the drying of the paints was tested again and was then 4¾ hours with an addition of aluminum.

The paint without Al had a viscosity of 390 mPa·s after 10 days and after 60 days the viscosity was 420 mPa·s.

The paint with Al had a viscosity of 570 mPa·s after 10 days and after 60 days 760 mPa·s.

EXAMPLE 2

800 g of an ester based on dipentaerythritol and tall oil fatty acid according to Example 1 was charged to a glass reactor of 1 liter. The ester was heated to 240° C. and then 24 g polyamide (Versamid 935 from Schering) was added. The batch was maintained at 240° C. for 2¼ h and then tapped.

The product obtained was an ester having a soft gelly consistency. Paint was made from this ester according to the recipe and process in example 1 but with the addition of 0.9 g Bentone SDI. The paint was siccativated with Co, Zr and Al as in Example 1.

The viscosity was after 10 days 280 mPa·s at 10 000 s$^{-1}$ 20° C. and after 60 days 215 mPa·s. The drying time when made was 6 hours and after storage for 28 days 6¾ hours. Paint which had been applied on a glass panel showed after 3–5 days a great resistency towards scratching and was after aging for 4 months in darkness hardly observably yellowed.

The viscosity after storage for 1 year was 730 mPa·s at 10,000s$^{-1}$ and 20° C.

The paint was test painted on primed board by means of a lacquer brush to a dry film thickness of about 30 μm. In the wet paint surface a zig-zag line was drawn with the shank of the brush whereafter the panel was immediately raised to an upright position for drying. After the drying no tendency to running could be observed.

In order to determine the open time and the time for setting of the paint, the paint was applied on a primed board. Still one hour after the application it was possible to brush in the film without getting permanent stripes from the brush.

EXAMPLE 3

From a tall oil fatty acid/dipenta ester acording to Example 1 a larger amount of paint siccativated with 0.06% Co and 0.09% Zr, was made. The paint was then divided into 100 g portions, to which different aluminum compounds were added in an amount giving a content of 1% by weight Al based on the weight of the binder. The paints obtained different contents of solvents, depending on the fact that the different aluminum compounds contained different types and amounts of solvents.

Data and characteristics for the paints have been compiled in the table.

| Paint no. | Type of aluminum compound | Solvent content | ICI Drying Recorder needle, after 3 d | Viscosity 20° C. 10 000 s$^{-1}$ mPa.s. after 3 d | after 70 d | Gardner gloss 60° 1 d after applying | 90 d after applying | Subjective estimation after storage for 3 months in a dark climate room |
|---|---|---|---|---|---|---|---|---|
| 1. | No additive | 0% | 3¾ h | 534 | 613 | 91 | 88 | Clearly yellowed, scratch sensible |
| 3. | Aluiminum di-isopropoxide monoethylace-toacetate (Manalox 36) | 1% iso-propanol | 8¼ h | 451 | 615 | 94 | 94 | Slighly yellowed, somewhat scratch sensible |
| 4. | Aluminum tri-isobutoxide aluminum tri-ethylaceto-acetate compound (Alusec 588) | 1.4% iso-butanol | 9¼ h | 391 | 619 | 95 | 95 | Slighly yellowed, somewhat scratch sensible |
| 5. | Aluminum ethylaceto-acetate di-isopropylate (Alusec 591) | 2.5% xylene/isopropyl alcohol | 6¾ h | 357 | 542 | 95 | 90 | Slightly yellowed, somewhat scratch sensible |
| 6. | Aluminum mono-ethylaceto-acetate iso-propyl alcohol complex (Alusec 801) | 1.2% xylene | 5¾ h | 347 | 445 | 96 | 90 | Somewhat yellowed, scratch sensible |
| 7. | Oxo aluminum ethylaceto-acetate iso-butoxide (EP 9095) | 2.2% white spirit | 6¼ h | 570 | 764 | 95 | 90 | Slightly yellowed, not scratch sensible |
| 8. | Titaniumchelate (Tyzor TE)(DuPont) | — | >10 h | 551 | 589 | 90 | 87 | Strongly yellowed, very scratch sensible, somewhat tacky |

EXAMPLE 4

In a glass reactor of 2 liter a tripentaester of tall oil fatty acid was made in the same way as in Example 1. The charge was 1415.6 g tall oil fatty acid having an AV of 195 and 284.4 g tripentaerythritol. The ester was run to an AV of 10.1 and obtained a somewhat tixotropic consistency.

Paint was made in accordance with Example 1 and siccativated with 0.06% Co, 0.09% Zr and 1% Al based on solid binder. The aluminum compound was the same as in Example 1.

The drying time of the paint was 4½ h after 3 days and the viscosity at 10,000 s$^{-1}$ 20° C. after 10 d was 290 mPa·s. After storage for 30 days the drying time was 4¼ h and after 60 days the viscosity was 620 mPa·s.

After aging for 4 months in darkness the paint film was slightly yellowed and very insensible for scratching.

EXAMPLE 5

An ester was made in the same way as in Example 1 but the charge was 1 468.6 g dehydrated castor oil fatty acid having an AV of 193 and 231.4 g dipentaerythritol. The acid value of the ester was run to 10.0 and the viscosity in an Emila viscometer at 20° C. was 490 mPa·s and the Gardner colour value was 3–4.

Paint was made and siccativated as above partly without and partly with the addition of aluminum. The paint not containing Al dried in 2½ h and the viscosity of the paint at 10,000 s$^{-1}$ was 257 mPa·s. After storage for 30 days the drying time was 2½ h and the viscosity after 70 days was 650 mPa·s. A paint film was after storage for 4 months in a dark climate room strongly yellowed and very sensible to scratching.

The paint containing aluminum dried in 3¼ h 3 days after being made and had a viscosity of 279 mPa·s after 10 days. After 30 days the drying time was 4½ h and the viscosity after 70 days was 890 mPa·s. An aged film was slightly yellowed and only slightly sensible to scratching.

EXAMPLE 6

800 g of an ester based on dipentaerythritol and tall oil fatty acid according to Example 1 was charged to a glass reactor. The ester was heated to 240° C. and then 24 g polyamide (Versamid 935 from Schering) was added. The batch was maintained at 240° C. for 2 hours and was then cooled to 80° C. Then 82.4 g EP 9095 was added, providing 1% by weight Al metal based on the thixotropic ester. The batch now was maintained for 1 hour at 80° C. and then tapped. The product obtained was a soft-medium hard gelly ester.

Paint was made from this ester according to the recipe below:

| | |
|---|---|
| TiO$_2$ | 25.0% by weight |
| Bentone SDI | 0.7 by weight |
| Binder as above | 71.9 by weight |
| Siccative* | 2.2 by weight |
| Methyl ethylketoxime | 0.2 by weight |

*corresponding to 0.05% Co, 0.3% Ba and 0.1% Zn as metal based on the binder

The solvent content of the paint was 2.3% and the viscosity was 465 mPa·s at 10 000 s$^{-1}$ at 20° C. and after 3 months 510 mPa·s. The drying time was 3½ hours.

A film that had been aged for 4 months in darkness was very scratch resistent and hardly observably yellowed.

EXAMPLE 7

800 g of an ester based on dipentaerythritol and tall oil fatty acid according to example 1 was charged to a glass reactor of 1 liter. The ester was heated to 240° C. and then 16 g polyamide (Versamid 935) was added. The batch was maintained at 240° C. for 2 hours and was then cooled to 80° C. 163.2 g EP 9095, corresponding to 2% Al metal based on the thixotropic ester, was added. The batch was maintained for 1 hour at 80° C. and then tapped. The product obtained was a soft gelly ester.

Paint was made from this ester according to the recipe in Example 6.

The solvent content of the paint was 4.2% and the viscosity was 420 mPa·s at 10 000 s$^{-1}$ and 20° C. and after 3 months 430 mPa·s. The drying time was 4 hours.

A film that had been aged for 4 months in darkness was very scratch resistant and showed no signs of being brittle and was hardly observably yellowed.

EXAMPLE 8

1549.5 g fish oil fatty acid having an acid value of 198 mg KOH/g and 250.5 g dipentaerythritol were charged to a glass reactor of 2 liter equipped as in Example 1. The stirrer and sparging of nitrogen were started and the temperature was quickly raised up to 160° C. The temperature was then raised with 25° C. per hour up to 235° C. and maintained at that temperature until an AV of 10.0, that is 7 hours from start or 4¼ hours at 235° C. The final ester had an AV of 10.0, a Gardner colour value of 8.5 and a viscosity of 320 mPa·s in an Emila viscometer at 20° C.

A paint was made according to the recipe and the process in Example 1. The paint was siccativated with 0.05% Co and 0.09% Zr as metal based on the ester. In addition EP 9095 was added in an amount of 10% based on the ester, corresponding to 1% Al metal based on the ester.

The viscosity was 455 mPa·s at 10 000 s$^{-1}$ and 20° C. After storage for 2 months the viscosity was 505 mPa·s. The drying time was 4¼ hours, but the film was tacky still 2 days after the application and after aging for 5 months in a climate room and darkness the film was soft and very scratch sensible but hardly observably yellowed.

EXAMPLE 9

1567.2 g linseed oil fatty acid having an AV of 199 mg KOH/g and 232.8 g dipentaerythritol was charged to a glass reactor of 2 liter equipped as in Example 1. The batch was heated under stirring and nitrogen sparging to 160° C. The temperature was then raised with 25° C. per hour up to 235° C. The batch was maintained at this temperature to an AV of 10.7, which lasted 12 hours at 235° C. The viscosity was 260 mPa·s in an Emila viscometer at 20° C. The Gardner colour value was 6–7.

A paint was made according to the recipe and the process in example 1. The paint was siccativated with 0.05% Co, 0.3% Ba, 0.1% Zn and 1% Al as metal based on the ester.

The drying time was short, 2½ hours, but a strong skin drying could be observed. The film was already after 1 day somewhat yellowed and after 1 month in darkness clearly yellowed, but glossy and scratch resistent. The viscosity of the paint was 270 mPa·s at 10,000 s$^{-1}$ and 20° C.

EXAMPLE 10

597 g of an ester according to Example 1 and 203 g aluminum monoethylacetoacetate isopropylalcohol complex (Alusec 801 from Manchem Ltd.) were charged to a glass reactor of 1 liter, provided with a water cooler and a liquid recipient. The aluminum compound contains 5.9% Al and as solvent 17% xylene/isopropanol.

The batch was heated with rigorous stirring to 65° C. A vacuum, 20 mbar, then was applied and maintained until 43 ml solvent had been collected. The batch was cooled and tapped.

The product was an ester containing 1.6% Al metal and 0.7% solvent. The viscosity was 370 mPa·s in an Emila viscometer at 20° C.

A paint was made from the ester consisting of 72 g ester, 25 g TiO$_2$, 0.6% Bentone SDI and 0.1% methyl ethylketoxim. The paint was siccativated with 0.05% Co, 0.3% Ba and 0.1% Zn as metal based on the binder.

The paint had a drying time of 2¾ hours at a film thickness of 50 μm dry film. The viscosity, at 10,000 s⁻¹ and 20° C., was 440 mPa·s. After 24 hours the paint film has dried to a hard film with a glossy surface. The solvent content in the paint was 0.5%.

COMPARATIVE EXAMPLES

Comparative example 1

An ester was made in the same way and with the same equipment as in example 1 but by charging 2877 g tall oil fatty acid having an AV of 195 and 374 g monopentaerythritol.

The ester obtained had an AV of 10.2 and a viscosity of 200 mPa·s at 20° C. on an Emila viscometer. The Gardner colour value was 4–5.

From said ester a paint was made (as in Example 1), composed of 67.5 g of the ester above and 25 g TiO₂ of rutile-type. The paint was ground on a cone mill to a grinding degree of 5 μm and was siccativated with 0.06% Co and 0.09% Zr, as metal based on the binder content (ester content), and 0.1% methyl ethylketoxim was added to prevent skinning. To be tested the paint was applied on a mirror glass plate (panel) with an applicator giving a dry film of 50 μm.

The drying time was 7 h measured on an ICI Drying Recorder with a scribing needle at 23±1° C. and a relative humidity of 50±5%. The film thickness in the drying determination was 30±2 μm. The paint contained no solvent.

A new paint was made according to the recipe above, but was now siccativated, in addition to Co and Zr, also with oxo aluminum ethylacetoacetate isobutoxide (EP 9095 from Manchem) in an amount corresponding to 10% of the binder. This gave 1% Al calculated on the binder. The drying time was >10 h. The paint now contained 2.3% solvent, white spirit, from the aluminum compound. The paints however dried to glossy films having a good whiteness in about 1 week.

The paint without aluminum had a viscosity of 270 mPa·s at 10,000 s⁻¹ on a Rotovisco rotation viscometer at 20° C. after 10 days and of 275 mPa·s after 60 days.

The paint with aluminum had a viscosity of 250 mPa·s 10 days after being made and after 60 days storage at ambient temperature of 340 mPa·s.

Comparative example 2

An ester was prepared according to Example 1 but from 1528.9 g tall oil fatty acid and 171.1 g glycerol. The combination gives an excess of 5% of OH-groups and the ester was run to an AV of 10.2. The viscosity was 110 mPa·s at 20° C. in an Emila viscometer.

Paint was made according to Example 1 and siccativated with 0.06% Co, 0.09% Zr and 1% Al based on the ester.

The viscosity of the paint when made was 69 mPa·s at 10,000 s⁻¹ and the drying time was more than 10 h.

The paint was applied on a glass panel which was kept in a dark climate room and after storage for one month the film was still soft and sensible to scratching.

A tight glass jar with paint was put in a stove at 40° C. After 100 days at this temperature the viscosity was again recorded and was then 167 mPa·s.

Comparative example 3

An ester was made according to Example 1 but from 1440 g dehydrated castor oil fatty acid and 160 g glycerol. The combination gives an excess of 5% of OH-groups and the ester was run to an AV of 11. The viscosity in an Emila viscometer at 20° C. was 170 mPa·s.

A paint made in accordance with Example 1 and siccativated with Co, Zr and Al in accordance with Comparative example 2 had the viscosity 147 mPa·s. and the drying time of 5½h. The paint was storage tested at 40° C. for 100 days in accordance with Comparative example 2 and the viscosity after this test was 354 mPa·s.

The paint was applied on a glass panel which was kept in a dark climate room and after storage for one month the film was still soft and sensible to scratching.

Comparative example 4

A paint was made according to the description in Comparative example 1 but as a binder was used a tall oil fatty acid modified isophthalic acid alkyde esterified with monopentaerythritol and having a fatty acid content of 84%. The paint was siccativated with 0.06% Co, 0.09% Zr and 1% Al was added as aluminum compound. The paint was diluted to a solids content of 80% by weight with white spirit and had the viscosity 310 mPa·s after 10 days, but had gelled after 60 days.

Comparative example 5

A paint was made from commercial boiled linseed oil as in Example 1 and siccativated with and without aluminum.

The paint without Al had the drying time 2¾h when prepared and after 37 days the drying time had been extended to 9½h. The viscosity was 300 mPa·s after 10 days and 810 mPa·s after 60 days. The paint was diluted with white spirit to a solids content of 94%. After aging in darkness for 4 months the paint film was strongly yellowed and very sensible to scratching. The paint containing aluminum had a drying time of 1 h when prepared, but was gelled when the drying was to be determined after 28 days. A 4 months old paint film was clearly yellowed but relatively insensible for nail scratching.

Comparative example 6

3124.8 g tall oil fatty acid and 475.2 g dipentaerythritol were charged to a glass reactor of 4 liter. The batch was heated under stirring and nitrogen sparging to 160° C. The temperature then was raised with 20° C. per hour to 260° C. The batch was maintained at this temperature until a slight polymerisation had taken place (stand oil) and the bodied oil had a viscosity of 610 mPa·s at 20° C. in an Emila viscometer. 20.5 hours at 260° C. were required. The acid value was 6.9 and the Gardner colour value 7–8.

800 g of this polymerised ester was charged to a glass reactor of 1 liter and heated to 240° C. Then 16 g polyamide (Versamid 935) was added and the batch was maintained at 240° C. for 2 hours, and then cooled to 80° C. Then 81.6 g EP 9095 was added and the batch maintained for 1 hour at 80° C. and then tapped. The medium hard thixotropic aluminum containing ester had a viscosity of 690 mPa·s at 10,000 s⁻¹ and 20° C.

Paint was made from the product according to the following recipe:

| | |
|---|---|
| TiO₂ | 26.0% by weight |
| Bentone SDI | 0.7 |
| Binder as above | 65.9 |

| | |
|---|---|
| White spirit | 5.2 |
| Siccative* | 2.0 |
| Methyl ethylketoxime | 0.2 |
| | 100.0 |

*Corresponding to 0.05% Co, 0.3% Ba and 0.1% Zn as metal based on the binder

The solvent content of the paint was 8.4% and the viscosity 340 mPa·s at 10,000 s⁻¹ and 20° C. After 2 months the viscosity was 510 mPa·s. The drying time was 3¾ hours.

The comparative examples (CE) above show that an ester prepared from tall oil fatty acid and monopentaerythritol (4 hydroxyl groups) (CE 1) as well as from glycerol (3 hydroxyl groups) (CE 2) will have a drying time that is too long to be of practical value. If the degree of unsaturation is increased in order to improve the drying properties the ester will anyhow not give a sufficient hardness (CE 3).

If an alkyd is made from tall oil fatty acid and monopentaerythritol, it will be necessary to add solvents to make the binder applicable. In addition the storage stability is not sufficient (CE 4).

Polymerized linseed oil requires no solvents, but is gelling and yellowing (CE 5).

A partly polymerized ester of tall oil fatty acid and dipentaerythritol will also require the addition of solvents to be applicable (CE 6).

I claim:

1. Binder composition for preparing an air drying lacquer consisting essentially of: (a) an ester reaction product of an unsaturated, monobasic, aliphatic carboxylic acid having 16–24 carbon atoms, or a mixture thereof, and a polyhydric alcohol having 6–8 hydroxyl groups; (b) an organoaluminum compound as a drying agent.

2. Binder composition according to claim 1, characterized in that the organoaluminum compound is present in an amount of 0.1–5% by weight Al based on the weight of the binder.

3. Binder compositon according to claim 1 wherein the binder has been obtained by esterification of a mixture of one or more unsaturated $C_{18}$ fatty acids with an aliphatic alcohol having 6–8 hydroxyl groups.

4. Binder composition according to claim 1 wherein the binder is a monomeric ester of tall oil fatty acid and dipentaerythritol.

5. Binder composition according to claim 1 wherein the binder has been obtained by esterification of the carboxylic acid with an equimolar excess of up to 25% of the alcohol.

6. Binder composition according to claim 1 wherein the organoaluminum compound is a derivative of an aluminum alkoxide or an oxy aluminum acylate.

7. Binder composition according to claim 1, further consisting essentially of a thixotropic agent.

8. An air drying lacquer consisting essentially of a binder composition of claim 1, a siccative, and pigment.

9. An air drying lacquer according to claim 8, free of a solvent for the binder.

10. Method of using a binder composition according to claim 1 for preparing an air drying lacquer, wherein the ingredients of the lacquer are dispersed or dissolved in the binder composition without the addition of a solvent.

11. An air drying lacquer consisting essentially of a binder composition of claim 1, a siccative, a thixotropic agent and an antiskinning agent.

* * * * *